United States Patent
Zasche

(10) Patent No.: US 11,279,047 B2
(45) Date of Patent: Mar. 22, 2022

(54) ROBOT ARM WITH A ROBOT-HAND DRIVE DEVICE

(71) Applicant: KUKA Deutschland GmbH, Augsburg (DE)

(72) Inventor: Moritz Zasche, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 48 days.

(21) Appl. No.: 16/754,874

(22) PCT Filed: Oct. 4, 2018

(86) PCT No.: PCT/EP2018/076976
§ 371 (c)(1),
(2) Date: Apr. 9, 2020

(87) PCT Pub. No.: WO2019/072673
PCT Pub. Date: Apr. 18, 2019

(65) Prior Publication Data
US 2020/0331151 A1    Oct. 22, 2020

(30) Foreign Application Priority Data

Oct. 9, 2017  (DE) .................... 10 2017 217 907.4

(51) Int. Cl.
*B25J 18/00*     (2006.01)
*B25J 9/10*      (2006.01)
(Continued)

(52) U.S. Cl.
CPC .............. *B25J 18/00* (2013.01); *B25J 9/102* (2013.01); *B25J 9/126* (2013.01); *H02K 7/083* (2013.01);
(Continued)

(58) Field of Classification Search
CPC ........ B25J 17/02; B25J 17/0283; B25J 18/00; B25J 9/0024; B25J 9/047; B25J 9/102;
(Continued)

(56) References Cited

U.S. PATENT DOCUMENTS 4,047,448 A * 9/1977 Pardo .................... B25J 17/0283
74/417
4,068,763 A * 1/1978 Fletcher ................. B25J 9/0087
414/4

(Continued)

FOREIGN PATENT DOCUMENTS

DE    2619336 A1 * 11/1976 .......... B25J 17/0283
DE   10121905 A1    2/2003
(Continued)

OTHER PUBLICATIONS

Wikipedia contributors. (Oct. 5, 2017). Electric motor. In Wikipedia, The Free Encyclopedia. Retrieved 18:28, Aug. 25, 2021, from https://en.wikipedia.org/w/index.php?title=Electric_motor&oldid=803880857 (Year: 2017).*

(Continued)

*Primary Examiner* — Joseph Brown
(74) *Attorney, Agent, or Firm* — Dorton & Willis, LLP

(57) ABSTRACT

A robot arm with a robot-hand drive device, which has at least three electric motors arranged in an arm boom of the robot arm for driving a multi-axis robot hand of the arm boom, each electric motor having an electric rotor, each of which has a motor shaft. The at least three electric motors are arranged in the interior of a common housing cylinder block, in such a way that each rotor lies in a separate cylinder sector of the housing cylinder block, more specifically with its respective motor shaft running parallel to the center axis of the housing cylinder block, said axis running longitudinally along the arm boom.

11 Claims, 4 Drawing Sheets

(51) Int. Cl.
*H02K 7/08* (2006.01)
*H02K 7/116* (2006.01)
*B25J 9/12* (2006.01)
*B25J 9/00* (2006.01)
*B25J 17/02* (2006.01)

(52) U.S. Cl.
CPC ............. *H02K 7/116* (2013.01); *B25J 9/0009* (2013.01); *B25J 17/0283* (2013.01)

(58) Field of Classification Search
CPC ......... B25J 9/126; H02K 16/00; H02K 16/02; H02K 16/025
See application file for complete search history.

(56) References Cited

U.S. PATENT DOCUMENTS

| | | | |
|---|---|---|---|
| 4,246,661 A | 1/1981 | Pinson | |
| 4,780,047 A * | 10/1988 | Holt | B25J 3/04 |
| | | | 414/730 |
| 5,036,724 A * | 8/1991 | Rosheim | B25J 17/0275 |
| | | | 74/490.06 |
| 5,684,351 A | 11/1997 | Elferich | |
| 2011/0126661 A1* | 6/2011 | Long | B25J 9/047 |
| | | | 74/490.05 |
| 2013/0104685 A1 | 5/2013 | Long | |
| 2013/0305869 A1 | 11/2013 | Krumbacher | |
| 2017/0225340 A1 | 8/2017 | Donella et al. | |

FOREIGN PATENT DOCUMENTS

| | | | | |
|---|---|---|---|---|
| DE | 102012208448 A1 | | 11/2013 | |
| EP | 0206009 A2 | * | 12/1986 | ............. H02K 16/00 |
| EP | 0721248 A2 | | 7/1996 | |
| EP | 2024144 B1 | | 1/2012 | |
| EP | 2666600 A2 | | 11/2013 | |
| FR | 2931092 A1 | | 11/2009 | |
| KR | 20100138480 A | * | 12/2010 | |
| WO | 2016020456 A1 | | 2/2016 | |

OTHER PUBLICATIONS

European Patent Office; Search Report in related International Patent Application No. PCT/EP2018/076976 dated Dec. 14, 2018; 3 pages.
European Patent Office; Written Opinion in related International Patent Application No. PCT/EP2018/076976 dated Dec. 14, 2018; 6 pages.
German Patent Office; Search Report in related German Patent Application No. 10 2017 217 907.4 dated Sep. 7, 2018; 6 pages.

* cited by examiner

ROBOT ARM WITH A ROBOT-HAND DRIVE DEVICE

CROSS-REFERENCE TO RELATED APPLICATIONS

This application is a national phase application under 35 U.S.C. § 371 of International Patent Application No. PCT/EP2018/076976, filed Oct. 4, 2018 (pending), which claims the benefit of priority to German Patent Application No. DE 10 2017 217 907.4, filed Oct. 9, 2017, the disclosures of which are incorporated by reference herein in their entirety.

TECHNICAL FIELD

The invention relates to a robot arm with a robot-hand drive device, which has at least three electric motors arranged in an arm boom for driving a multi-axis robot hand of the arm boom, each electric motor having an electric rotor, each of which has a motor shaft.

BACKGROUND

A robot arm with a robot-hand drive device is known from EP 2 024 144 B1 which comprises a plurality of drive motors with drive shafts arranged in an arm boom of the robot for driving a robot hand of the arm boom, wherein at least one of the drive motors is arranged forwardly offset from at least one other of the drive motors in the axial direction of the robot hand and wherein the drive shafts of the drive motors are formed as straight shafts that run parallel to each other, which end at substantially the same axial height, wherein three drive shafts are provided that are arranged so that a distance of the drive shaft of a middle drive motor from one of the drive shafts of two lateral drive motors is less than the sum of the radii of the motor housings of an adjacent pair of the axially offset drive motors.

SUMMARY

The object of the invention is to develop a robot arm with an arm boom that has an especially compact configuration.

According to the invention, this object is achieved by a robot arm with a robot-hand drive device which has at least three electric motors arranged in an arm boom of the robot arm for driving a multi-axis robot hand of the arm boom, each electric motor having an electric rotor with a motor shaft, wherein the at least three electric motors are arranged in the interior of a common housing cylinder block in such a way that each rotor lies in a separate cylinder sector of the housing cylinder block, more specifically with its respective motor shaft running parallel to the center axis of the housing cylinder block, said axis running longitudinally along the arm boom.

The robot arm may comprise a base frame, a carousel rotatably positioned on the base frame around a vertical axis of rotation and a rocker rotatably positioned on the carousel around a first horizontal axis of rotation. At a free end opposite the carousel, the rocker may comprise the arm boom, which can be rotatably positioned on this free end of the rocker around a second horizontal axis of rotation. The base frame, the carousel and the rocker may therefore form three base members of the robot arm. The vertical axis of rotation connecting the base frame with the carousel may form a first base axis of the robot arm. The first horizontal axis of rotation connecting the carousel with the rocker may form a second base axis of the robot arm. The second horizontal axis of rotation connecting the rocker with the arm boom may form a third base axis of the robot arm.

The robot boom may comprise, for example, a fourth, fifth and sixth robot axis of the robot arm. The arm boom may comprise a base arm rotatably arranged on the free end of the rocker on which a front arm of the arm boom is rotatably arranged around the fourth robot axis. The front arm may support, for example, a two-axis robot hand. The fourth robot axis and the two further robot axes of the robot hand may form three hand axes of the robot arm. The three hand axes may, together with the three base axes, represent a six-axis articulated arm robot. The robot arm may, however, also comprise a different number of base axes and/or hand axes. Regardless of the number of base axes and/or hand axes, only two hand axes or four hand axes or more than four hand axes may be provided instead of three hand axes. Consequently, the robot arm may comprise a robot-hand drive device comprising at least two electric motors arranged in the arm boom of the robot arm for driving the robot hand of the arm boom, of which at least two electric motors comprise an electric rotor with a motor shaft and the at least two electric motors are arranged in the interior of a common housing cylinder block in such a way that each of the at least two rotors lies in a separate cylinder sector of the housing cylinder block, more specifically with its respective motor shaft running parallel to the center axis of the housing cylinder block, said axis running longitudinally along the arm boom.

The robot-hand drive device may be configured to move the three hand axes of the robot arm, i.e., the fourth, fifth and sixth robot axis of the robot arm. To this purpose, the robot-hand drive device comprises at least three electric motors arranged in the arm boom of the robot arm for driving the multi-axis robot hand of the arm boom.

Each electric motor comprises an electric rotor with one motor shaft each. Each electric motor furthermore comprises a stator. Both the rotor and/or the stator may generally be provided with a winding of electric wires. A rotor winding and/or a stator winding may be provided, for example. Depending on the type of the electric motor, permanent magnets may be provided instead of a rotor winding or a stator winding as well, which replace either the rotor winding or the stator winding. All electric motors arranged in the interior of the housing cylinder block can be controlled independently from each other in their respective rotational speeds of the motor shafts.

Generally, however, synchronous motors, in particular servomotors, are preferably used for robots, which comprise both a rotor winding and a stator winding. One advantage of a synchronous motor is the fixed relationship of the rotational speed and the angular position with the operating frequency. Usually, the synchronous motors are therefore provided with sensors for the determination of the position, i.e., for the determination of the rotary orientation of the rotor. The rotary orientation of the motor shaft determined by the sensors, i.e., the rotary orientation of the motor shaft is transmitted to an electronic control unit, which is generally arranged outside of the actual motor, the so-called servo controller, which controls the movement of the motor on the basis of one or more adjustable target values such as the target angular position or the target rotational speed of the motor shaft.

Since the at least three electric motors are arranged in the interior of a common housing cylinder block so that each rotor lies in a separate cylinder sector of the housing cylinder block, more specifically with its respective motor shaft running parallel to the center axis of the housing cylinder block, said axis running longitudinally along the arm boom, the motors can be packed tightly, which makes it possible to produce a robot arm with an arm boom that has a particularly compact configuration.

The housing cylinder block may form a receiving housing into which the at least three electric motors, each as a complete single motor and having a rotor, a stator and a motor housing, are inserted. Alternatively, the housing cylinder block may form a common motor housing in which only the at least three rotors are rotatably positioned. In the latter embodiment, the housing cylinder block forming a common motor housing may preferably also comprise the laminated stator cores and/or stator windings or stator permanent magnets of all the at least three electric motors.

Due to these configurations, the rotors of the at least three electric motors with their motor shafts may be arranged particularly close to each other in the arm boom of the robot arm. This is particularly possible without having to connect additional transmission shafts such as drive shafts or straight shafts to the motor shafts. Since the transmission shafts are no longer necessary, the at least three electric motors may also be positioned axially, i.e., in the longitudinal extension of the arm boom and very close to the front arm of the arm boom. This results in a particularly short configuration of the robot-hand drive device. The robot-hand drive device may, in special embodiments, be coupled directly, i.e., without using transfer shafts, to a gear drive of the arm boom, in particular to a spur gear drive and/or a cycloidal gear drive for the transmission of the torque and/or flanged to be fastened to the spur gear and/or the cycloidal gear drive.

Due to the housing cylinder block according to the invention, electric cables and/or electric plugs may, depending on the embodiment, be dispensed with as well, or the electrical cables may be shorter.

Since each rotor lies in a separate cylinder sector of the housing cylinder block, the at least three electric motors may be arranged on the same or at least on approximately the same height (in the longitudinal extension of the arm boom). In particular, if the rotors are identical, this may result in a configuration in which the motor shaft end with its output-side shaft ends at the same or at least at approximately the same axial height (in the longitudinal extension of the arm boom).

A respective cylinder sector results, for example, in a plain cylindrical housing cylinder block from a circular sector of an end wall of the plain cylinder-shaped housing cylinder block and the longitudinal extension of the housing cylinder block in the axial direction, i.e., in the longitudinal extension of the arm boom.

The housing cylinder block may be formed from one piece. Alternatively, the housing cylinder block may also be made up of several pieces or a plurality of individual pieces. The housing cylinder block may, for example, be composed of a plurality of stacked metal layers. The stacked metal layers may preferably form the laminated stator core that interacts with the at least three rotors to form the at least three electric motors.

The housing cylinder block may comprise an at least substantially plain cylindrical outer wall, and the rotors of the at least three electric motors may be arranged with their motor shafts in the interior of the housing cylinder block in such a way that they are evenly distributed across a circumference around the center axis of the housing cylinder block. The housing cylinder block may preferably comprise an at least substantially plain cylindrical outer wall in such a way that the housing cylinder block is inserted at least substantially flush into a hollow member of the robot arm, i.e., in the hollow front arm of the arm boom and/or in the hollow base arm of the arm boom. In a first variant, the housing cylinder block may be inserted completely into the base arm of the arm boom. In a second variant, the housing cylinder block may be inserted completely into the front arm of the arm boom. In a third variant, the housing cylinder block may be partially inserted, i.e., by means of a first axial partial length of the housing cylinder block within the base arm of the arm boom and partially, i.e., by means of a second axial partial length of the housing cylinder block of the front arm of the arm boom. In each variant, the housing cylinder block may be detachably fastened, for example screwed into the arm boom in a non-destructive manner by means of tools. The housing cylinder block may either be fastened to the hollow base arm or the hollow front arm or alternatively flanged to a gear drive, in particular on a spur gear drive of the arm boom and/or a cycloidal gear drive, which, in turn, is fastened to the hollow base arm or the hollow front arm.

The housing cylinder block comprising the at least three electric motors may therefore be arranged within a hollow arm housing of the arm boom of the robot arm. The hollow arm housing, in particular the hollow base arm and/or the hollow front arm may form bearing components, i.e., members of the robot arm. The hollow arm housing, in particular the hollow base arm and/or the hollow front arm, provide a bearing function in this embodiment so as to form the members of the robot arm and keep these in a specific configuration, i.e., joint positions. This means that all forces and momentums that are required to hold and/or move a load to be supported by the robot arm and to hold and/or move the weight components of the robot arm itself are transmitted via the hollow arm housing, in particular the hollow base arm and/or the hollow front arm.

The housing cylinder block comprising the at least three electric motors may be a load-bearing structural element of the arm boom of the robot. This means that the housing cylinder block is formed to transmit all forces and momentums that are required to hold and/or move a load to be supported by the robot arm and to hold and/or move the weight components of the robot arm itself via the housing cylinder block, either in whole or in part. In a special embodiment variant, the outer wall of the housing cylinder block is exposed, i.e., the housing cylinder block is not arranged in the interior of the front arm or the base arm. The housing cylinder block may thus form a load-bearing connecting piece between the front arm and the base arm. The housing cylinder block may, in such a case, either be flanged to the base arm and rotate relative to the front arm, or the housing cylinder block may be flanged to the front arm and rotate relative to the base arm.

The housing cylinder block may be formed by an integrally cast piece, in which a respective number of recesses corresponding to the at least three electric motors are formed, into which one of the at least three electric motors is inserted. In this embodiment, the housing cylinder block may basically be formed similar to a revolver magazine with plain cylindrical, axially extending holes or cylinder pockets into which the at least three electric motors are inserted like rounds.

The housing cylinder block may form a common motor housing of all rotors of the at least three electric motors. The motor housings of electric motors are often provided with external cooling fins. In the case of a housing cylinder block according to the invention, the cooling fins may, for example, be mounted to the exterior wall of the housing cylinder block, and the at least three electric motors, which then individually do not have any cooling fins, may be inserted into the housing cylinder block so that the cooling fins of the housing cylinder block jointly form the cooling ribs of all inserted motors. Alternatively, the housing cylinder block may be formed without cooling ribs. In that case the exterior wall of the housing cylinder block would be smooth.

The housing cylinder block may comprise a laminated stator core, which forms a common laminated stator core of all the at least three electric motors. The housing cylinder block therefore does not have to be formed from one piece. Rather, the housing cylinder block may be composed of a plurality of individual parts. The housing cylinder block may thus be composed of a plurality of stacked metal layers. At the same time, the stacked metal layers form a laminated stator core that interacts with the at least three rotors to form the at least three electric motors. The recesses which form the receiving pickets for the rotors in the stacked state of the stator laminations may therefore be easily produced in the individual stator laminations by punching the stator laminations.

The motor shafts of the at least three electric motors may be arranged on a common pitch circle around the center axis of the arm boom in the housing cylinder block in the longitudinal extension of the arm boom. This means that the axes of the motor shafts all have the same radial distances from the center axis of the arm boom and of the housing cylinder block. Preferably, the motor shafts of the at least three electric motors are arranged on the common pitch circle at equal distances from each other. This means that all motor shafts are equally arranged on the pitch circle across the circumference. The housing cylinder block therefore generally extends with its center axis in the direction of the longitudinal extension of the arm boom, i.e., of the base arm and the front arm.

All rotors of the at least three electric motors may, with respect to the center axis of the arm boom running along the longitudinal extension of the arm boom, be arranged on the same axial height in the housing cylinder block. This means that the electric motors, in particular the rotors of all the at least three electric motors, are not axially offset against each other in the housing cylinder block. Rather, all rotors are positioned laterally, i.e., in the radial direction, next to each other. The housing cylinder block also generally extends here with its center axis in the direction of the longitudinal extension of the arm boom, i.e., of the base arm and of the front arm.

The multi-axis robot may comprise at least one gear drive with a gear drive housing that is flanged to the housing cylinder block.

The at least one gear drive is formed to translate and/or distribute the torque generated by the electric motors to the fourth, fifth and sixth axis of the robot arm, i.e., to the robot hand axes. The arm boom may comprise a base arm that is rotatably positioned at the free end of the rocker on which a front arm of the arm boom is rotatably arranged around the fourth robot axis. The front arm may support, for example, a two-axis robot hand. The fourth robot axis and the two further robot axes of the robot hand may form three hand axes of the robot arm. The three hand axes may, together with the three base axes, form a six-axis articulated robot arm.

The rotors of the at least three electric motors may, with their motor shafts, each be rotatably positioned in the housing cylinder block by means of ball bearings.

Each rotor may be rotatably positioned in the housing cylinder block by means of at least one front ball bearing facing away from the output-side end of the respective motor shaft, and each rotor may be rotatably positioned in the housing cylinder block by means of at least one rear ball bearing facing away from the output-side end of the respective motor shaft. In this embodiment, the rotors are each completely rotatably positioned in the housing cylinder block.

Alternatively, each rotor may be rotatably positioned on the gear drive housing of the gear drive by means of at least one front ball bearing facing the output-side end of the respective motor shaft, and each motor may be rotatably positioned in the housing cylinder block by means of at least one rear ball bearing facing away from the output-side end of the respective motor shaft. In this embodiment, the rotors are each not completely rotatably positioned in the housing cylinder block. In this embodiment, the rotors are each rotatably positioned at one side in the housing cylinder block and on the other side on the gear drive housing of the gear drive to which the housing cylinder block is flanged. Thus, the complete positioning of the individual rotors may be distributed to the housing cylinder block and the gear drive housing, which can shorten the overall length of the assembly.

In a further alternative embodiment, the motor shaft may also be positioned completely in the housing cylinder block. In an embodiment variant in which the motor shaft comprises a spur gear that is supported in the gear drive, a separate positioning of the motor shaft on this shaft end may be dispensed with. This is possible, in particular, when an otherwise provided front motor shaft bearing would have to be arranged very closely to the spur gear. If the front motor shaft bearing is dispensed with, the motor shaft is only positioned by a rear motor shaft bearing, and the front shaft end of the motor shaft is supported in the gear drive by means of the spur gear.

The gear drive may, as a first gear drive, comprise at least one spur gear arranged on a gear drive shaft, wherein the at least one gear drive shaft is attached to the output-side end of the at least one motor shaft, and the arm boom may comprise a second gear drive, which is flanged to the first gear drive, wherein the at least one output-side end of the gear drive shaft is positioned in the gear drive housing of the second gear drive by means of a ball bearing.

The second gear drive may be a cycloidal gear drive comprising three eccentric shafts evenly arranged across a circumference, wherein the motor shafts of the at least three motors rotatably arranged in the housing cylinder block are arranged on the same circumference in the housing cylinder block as the eccentric shafts in the cycloidal gear drive. The cycloidal gear drive may be configured, in particular, to move the fourth robot axis, i.e., to rotate the front arm of the arm boom relative to the base arm of the arm boom.

The spur gear drive may be formed to transmit the torque generated, in particular, by the two electric motors to the two hand axes (fifth and sixth robot axes).

A specific embodiment of the invention is explained in the description of the figures below with reference to the inserted figures. Specific features of this exemplary embodiment may represent general features of the invention, regardless in what context they are mentioned, and, if applicable, even individually or in other combinations of the features.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
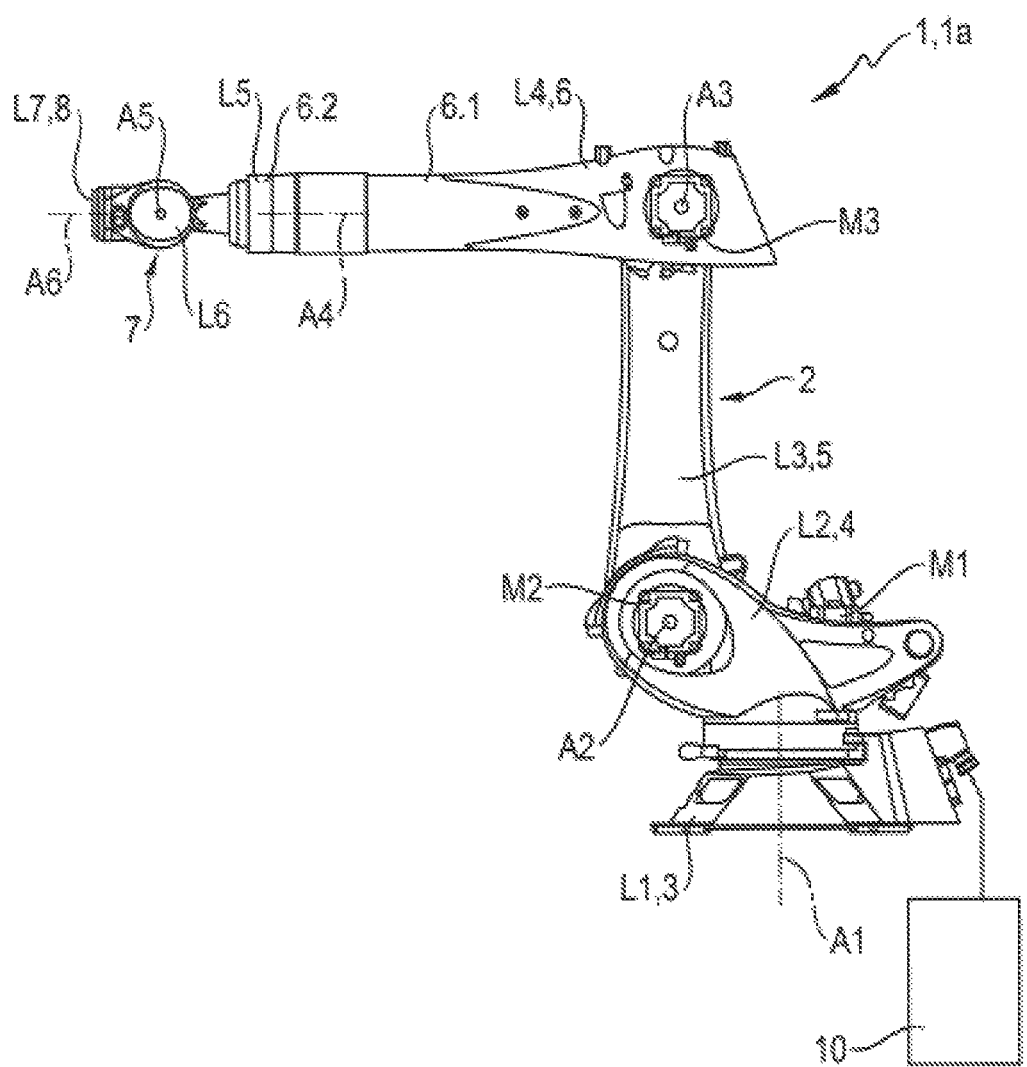
FIG. 1 shows a side view of an exemplary industrial robot in the form of a six-axis articulated arm robot comprising an arm boom according to the invention.

FIG. 1 shows a robot 1 in the exemplary configuration of a six-axis articulated arm robot 1*a* comprising a robot arm 2 and a robot control device 10. The robot arm 2 comprises, in the case of the present exemplary embodiment, a plurality of members L1 to L7 which are arranged consecutively and rotatably connected with each other by means of joints.

The robot control device 10 of the robot 1 is formed and/or configured to execute a robot program by which the joints (robot axis A1 to A6) of the robot arm 2 can be moved or rotated according to the robot program in an automated or manual manner. To this purpose, the robot control device 10 is connected to controllable electric motors M1 to M6 of the robot 1, which are configured to move the joints (robot axis A1 to A6) of the robot 1.

The members L1 to L7 are, in the case of the present exemplary embodiment of an industrial robot 1*a*, a frame 3 and a carousel 4, which is rotatably positioned relative to the frame 3 around a vertically running robot axis A1. Further members of the robot arm 2 are a rocker 5, an arm boom 6 and a preferably multi-axis robot hand 7 with a fastening device configured as a tool flange 8, which is used to fasten a robot gripper, for example. The rocker 5 is rotatably positioned at the lower end, i.e., at the joint of the rocker 5 on the carousel 4 around a preferably horizontal robot axis A2.

At the upper end of the rocker 5, the arm boom 6 is rotatably positioned around an also preferably horizontal axis A3 on the joint of the rocker 5. This arm boom comprises at its end the robot hand 7 with its preferably three robot (hand) axes A4, A5, A6. The robot axes A1 to A6 are driven by one of the electric motors M1 to M6, which are controlled by the program of the robot control device 10. Generally, a gear drive may be provided between each of the members L1 to L7 and the correspondingly assigned electric motors M1 to M6.

The arm boom 6 comprises, in the case of the present exemplary embodiment, a housing cylinder block according to the invention with exactly three electric motors (M4 to M6).

The arm boom 6 thus comprises, in the case of the present exemplary embodiment, the fourth robot axis A4, the fifth robot axis A5 and the sixth robot axis A6 of the robot arm 2. The arm boom 6 comprises a base arm 6.1 which is rotatably arranged on the free end of the rocker 5, with a front arm 6.2 of the arm boom 6 being rotatably positioned on said base arm around the fourth robot axis A4. The front arm 6.2 supports the two-axis robot hand 7. The fourth robot axis A4 and the two further robot axes A5 and A6 of the robot hand 7 form three hand axes of the robot arm 2. The three hand axes form, together with the three base axes A1, A2 and A3, the six-axis articulated arm robot 1*a*.

Figure 2:
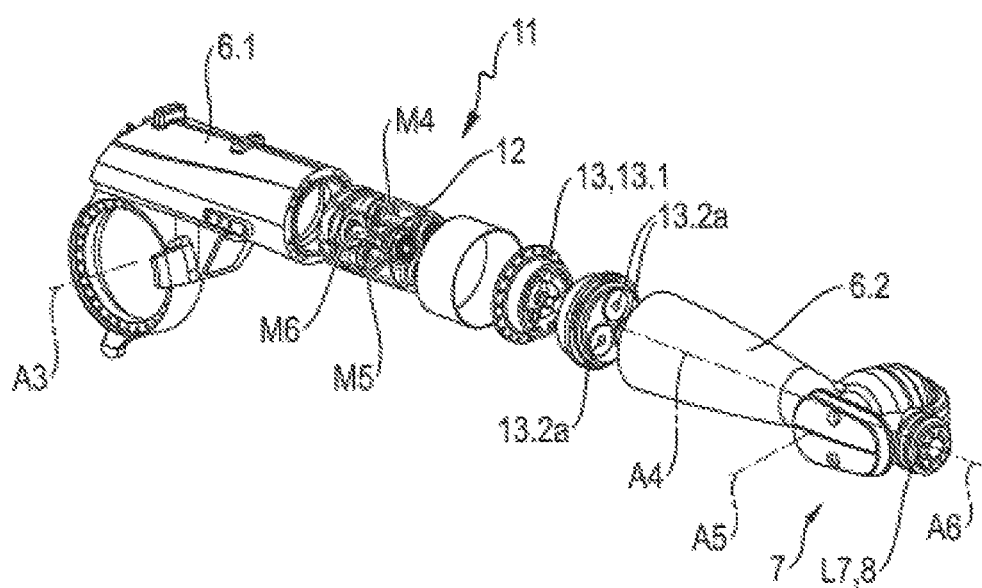
FIG. 2 shows an exploded perspective view of a specific exemplary embodiment of an arm boom with a housing cylinder block according to the invention and three exemplary motors.
Figure 3:
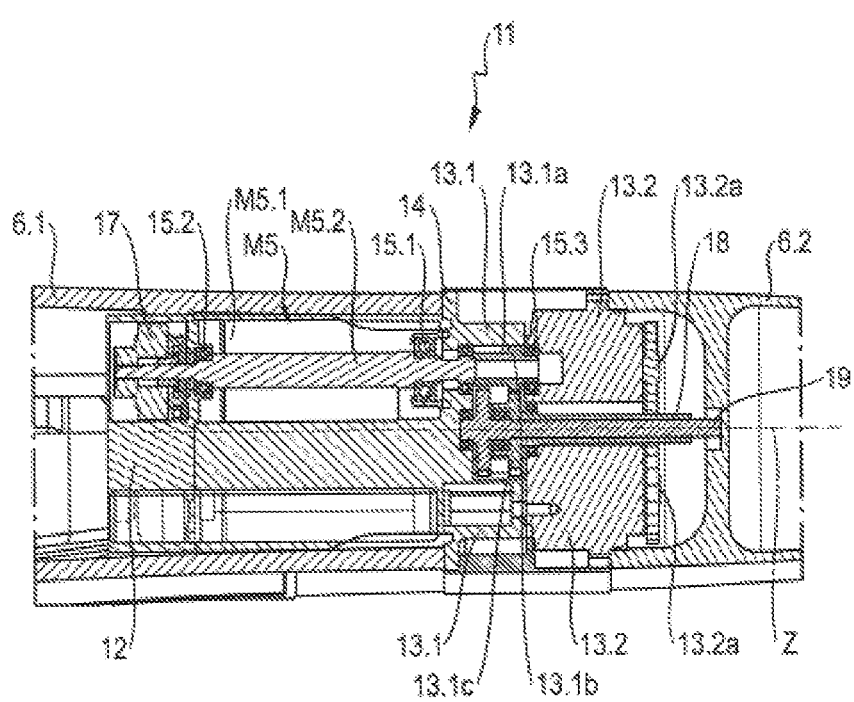
FIG. 3 shows a section view of the housing cylinder block according to the invention in the area of one of the three electric motors, a spur gear drive and a cycloidal gear drive of the arm boom.
Figure 4:
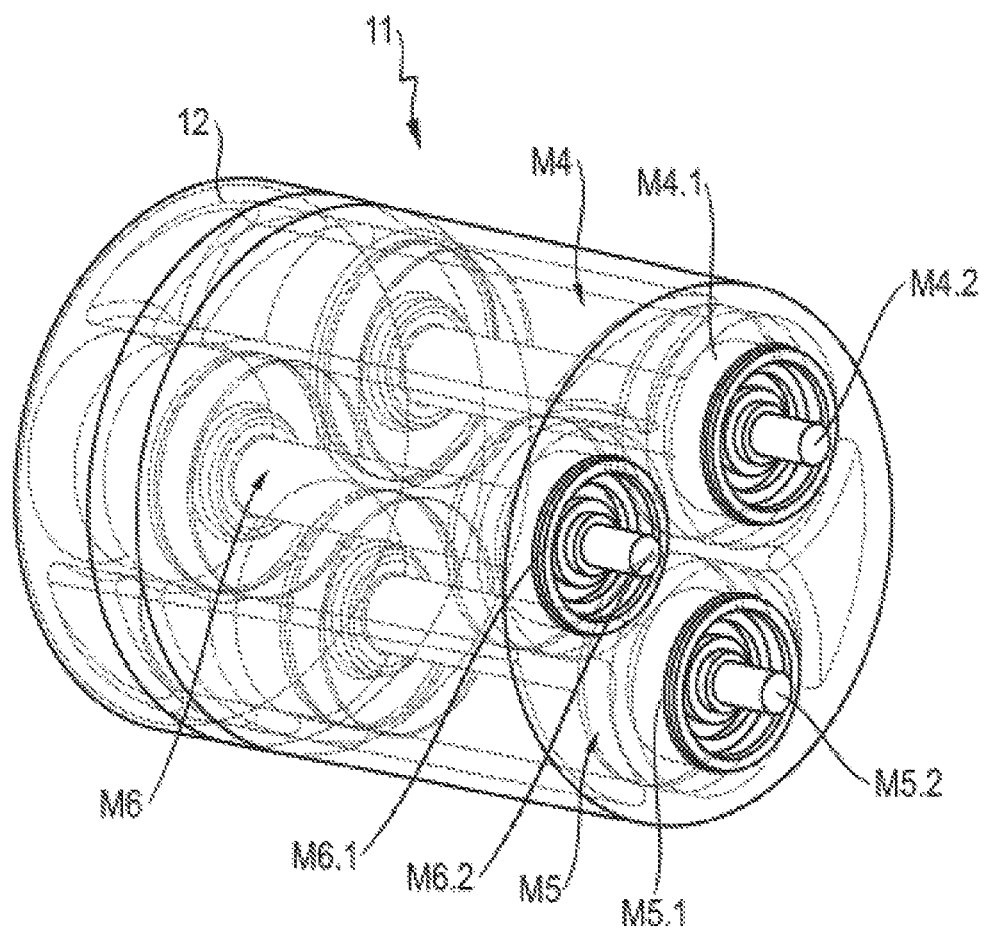
FIG. 4 shows a perspective view of the housing cylinder block according to the invention with the three motors installed in it.

The robot arm 2 or the arm boom 6 according to FIG. 2 to FIG. 4 comprises a robot-hand drive device 11. The robot-hand drive device 11 comprises at least three electric motors M4, M5, M6 arranged in the arm boom 6 of the robot arm 2 for driving the multi-axis robot hand 7 of the arm boom 6. Each of the electric motors M4, M5, M6 comprises an electric rotor M4.1, M5.1 and M6.1 with one motor shaft M4.2, M5.2 and M6.2 each.

According to the invention, the at least three electric motors M4, M5 M6 are arranged in the interior of a common housing cylinder block 12 in such a way that each rotor M4.1, M5.1, M6.1 lies in a separate cylinder sector of the housing cylinder block 12, more specifically with its respective motor shaft M4.2, M5.2, M6.2 running parallel to the center axis Z of the housing cylinder block 12, said axis running longitudinally along the arm boom 6.

In the case of the present exemplary embodiment, the housing cylinder block 12 comprises an at least substantially plain cylindrical outer wall, and the rotors M4.1, M5.1, M6.1 of the at least three electric motors M4, M5, M6 are arranged with their motor shafts M4.2, M5.2 and M6.2 in the interior of the housing cylinder block 12 in such a way that they are evenly distributed across a circumference around the center axis Z of the housing cylinder block 12.

The housing cylinder block 12 comprising the at least three electric motors M4, M5, M6 is arranged inside a hollow arm housing, i.e., in the case of the present exemplary embodiment inside the base arm 6.1 of the arm boom 6 of the robot arm 2.

The housing cylinder block 12 forms a common motor housing of all rotors M4.1, M5.1 and M6.1 of the three electric motors M4, M5, M6.

The motor shafts M4.2, M5.2, M6.2 of the at least three electric motors M4, M5, M6 are arranged on a common pitch circle around the center axis Z of the arm boom 6 in the longitudinal extension of the arm boom 6 in the housing cylinder block 12. This means that in the case of the three electric motors M4, M5, M6, these are offset from each other by 120 degrees.

All rotors M4.1, M5.1, M6.1 of the three electric motors M4, M5, M6 are, with respect to the center axis Z of the arm boom 6 in the longitudinal extension of the arm boom 6, arranged in the housing cylinder block 12 at the same axial height.

The multi-axis robot hand 7 or the base arm 6.1 and/or the front arm 6.2 comprises at least one gear drive 13 with a gear drive housing 14 to which the housing cylinder block 12 is flanged.

The rotors M4.1, M5.1, M6.1 of the at least three electric motors M4, M5, M6 are each rotatably positioned with their motor shafts M4.2, M5.2 and M6.2 in the housing cylinder block 12 or in the first gear drive housing 14.1 by means of ball bearings 15, as shown in particular in FIG. 3.

Each rotor M4.1, M5.1 and M6.1 is rotatably arranged on the gear drive housing 14.1 of the first gear drive 13.1 in the case of the present exemplary embodiment by means of at least a front ball bearing 15.1 facing the output-side end of the respective motor shafts M4.2, M5.2 and M6.2, and each rotor M4.1, M5.1 and M6.1 is rotatably arranged in the housing cylinder block 12 by means of at least one rear ball bearing 15.2 facing away from the output-side end of the respective motor shafts M4.2, M5.2 and M6.2.

In the case of the present exemplary embodiment of FIG. 3, the arm boom 6 thus comprises a first gear drive 13.1 that comprises at least one spur gear stage. The spur gear stage comprises at least one spur gear shaft 13.1b arranged on at least one gear drive shaft 13.1a, and the at least one gear drive shaft 13.1a is attached to the output-side end of one of the at least one motor shaft M5.2. In the case of the present exemplary embodiment of FIG. 3, the arm boom 6 also comprises a second gear drive 13.2 flanged to the first gear drive 13.1, wherein an output-side end of the gear drive shaft 13.1a is positioned in the gear drive housing 14.2 of the second gear drive 13.2 by means of at least one ball bearing 15.3.

As specifically shown in FIG. 3, the housing cylinder block 12, the first gear drive 13.1 and the second gear drive 13.2 are consecutively arranged in the arm boom 6 in the direction of the center axis Z.

In the section view of FIG. 3, the electric motor M5 that drives the fifth robot axis A5 is shown in a cross-sectional view. The two other motors M4 and M6 may be configured identically, wherein, in that case, the motor shafts M4.2 and M6.2 are coupled differently to the first gear drive 13.1 or the second gear drive 13.2. Unless specifically mentioned, however, the features used to describe the electric motor M5 are present in the two other motors M4 and M6 as well.

FIG. 3 shows on the left side the end of the motor shaft M5.2 that faces away from the first gear drive 13.1 and the second gear drive 13.2. This end of the motor shaft M5.2 facing away from the first gear drive 13.1 and from the second gear drive 13.2 is positioned in the housing cylinder block 12 by means of the second ball bearing 15.2. A tapered continuation of this end of the motor shaft M5.2 extends through the second ball bearing 15.2. A sensor 17 is arranged on this tapered continuation, which measures the rotational position of the motor shaft M5.2. The sensor 17 may, for example, be a resolver or an incremental encoder. By means of the sensor 17, the motor M5 can be controlled with respect to its rotational position, rotational speed and/or rotational acceleration. The electric motor M5 and the sensor 17 thus form a servomotor in the case of the present exemplary embodiment.

At another end of the motor shaft M5.2 positioned opposite the sensor 17, the motor shaft M5.2 is positioned by means of a first ball bearing 15.1. The first ball bearing 15.1 is thus arranged on another end of the motor shaft M5.2 that faces the first gear drive 13.1 and the second gear drive 13.2. The first ball bearing 15.1 and the second ball bearing 15.2 may form a fixed/floating bearing arrangement for the motor shaft M5.2.

In the case of the present exemplary embodiment of FIG. 3, the second ball bearing 15.2 is positioned in the housing cylinder block 12 and the first ball bearing 15.1 in the first gear drive 13.1. As shown, the position of the first ball bearing 15.1 may be arranged on an end wall of the first gear drive 13.1 facing the housing cylinder block 12.

A tapered continuation of this end of the motor shaft M5.2 extends through the first ball bearing 15.1 as well. A gear drive shaft 13.1a is attached to this tapered continuation in a rotation-fixed manner, for example by means of a splined connection. The gear drive shaft 13.1a of the gear drive 13.1 supports a driving spur gear 13.1b in the case of the present exemplary embodiment of FIG. 3. The driving spur gear 13.1b engages with a driven spur gear 13.1c of the first gear drive 13.1. The driven spur gear 13.1c itself is connected with a quill shaft 18, which drives, i.e., moves, the fifth robot axis A5 of the robot hand 7. The quill shaft 18 is positioned in the second gear drive 13.2 by means of a separate first ball bearing and is supported by a central shaft 19 by means of a second ball bearing.

Inside the quill shaft 18, the central shaft 19 is rotatably arranged coaxially from the quill shaft. The central shaft 19 is supported by means of ball bearings by the quill shaft 18 on the one side and the first gear drive 13.1 on the other side. Between the two ball bearings, the central shaft 19 comprises a driven spur gear, which engages with a driving spur gear that is driven in the same manner as in the motor M5 by the motor M6 via a second drive gear shaft of the first drive gear 13.1. The central shaft 19 thus drives, in the case of the present exemplary embodiment, the sixth robot axis A6 of the robot hand 7.

The motor M4 drives, i.e., rotates the fourth robot axis A4 and thus causes the front arm 6.2 to rotate relative to the base arm 6.1.

The front arm 6.2 relative to the base arm 6.1 is caused to rotate by means of the motor M4 via the second gear drive 13.2.

The second gear drive 13.2 is, in the case of the present exemplary embodiment, a cycloidal gear drive, for example, which comprises three eccentric shafts 13.2a that are evenly arranged across a circumference and wherein the motor shafts M4.2, M5.2 and M6.2 of the at least three motors M4, M5 and M6 that are rotatably arranged in the housing cylinder block 12 are arranged on the same circumference in the housing cylinder block 12 as the eccentric shafts 13.2a in the cycloidal gear drive.

In the case of the present exemplary embodiment, the motor M4 drives one of the three eccentric shafts 13.2a of the cycloidal gear drive. Since the motor shaft M4.2 is directly coupled to the one eccentric shaft 13.2a, and in particularly attached to it in a rotatably fixed manner, at least the motor M4 must be on the same pitch circle as the eccentric shaft 13.2a that is directly connected to the motor shaft M4.2. An outer housing of the cycloidal gear drive may be firmly attached to the front arm 6.2, and an inner housing of the cycloidal gear drive that is rotatable relative to the outer housing of the cycloidal gear drive may thus be firmly attached to the housing of the first gear drive 13.1 or the base arm 6.1.

In addition, the housing cylinder block 12 and the gear drive housing of the first gear drive 13.1 may be formed as an integral drive gear housing. Instead of a first gear drive 13.1 with spur gear teeth, the torque may also be transmitted in the first gear drive by means of drive belts.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot arm with a robot-hand drive device, comprising:
   an arm boom of the robot arm;
   a multi-axis robot hand operatively coupled with the arm boom; and at least three electric motors arranged in the arm boom for driving the robot hand;

each electric motor comprising an electric rotor, each electric rotor including a motor shaft;

wherein the at least three electric motors are arranged in an interior of a common housing cylinder block in such a way that each rotor lies in a separate cylinder sector of the housing cylinder block;

wherein the arm boom comprises an arm housing having a hollow interior, and the housing cylinder block including the at least three electric motors is arranged inside the hollow interior of the arm housing;

wherein the multi-axis robot hand comprises at least one gear drive with a gear drive housing to which the housing cylinder block is flanged;

wherein each rotor is rotatably arranged on the gear drive housing of the gear drive by at least one front ball bearing facing an output-side end of the respective motor shaft;

each rotor is rotatably arranged in the housing cylinder block by at least one rear ball bearing facing away from the output-side end of the respective motor shaft;

the gear drive, as a first gear drive, comprises at least one spur gear stage;

the at least one spur gear stage comprising at least one spur gear drive arranged on at least one gear drive shaft attached to the output-side end of one of the motor shafts;

the arm boom comprises a second gear drive flanged to the first gear drive;

an output-side end of the gear drive shaft is positioned in the gear drive housing of the second gear drive by at least one ball bearing;

the second gear drive is a cycloidal gear drive comprising three eccentric shafts that are evenly arranged across a circumference; and the motor shafts of the at least three motors rotatably arranged in the housing cylinder block are arranged on the same circumference in the housing cylinder block as the eccentric shafts in the cycloidal gear drive.

2. The robot arm of claim 1, wherein the at least three electric motors are arranged in the interior of the housing cylinder block such that each motor shaft of the respective electric motors extends along a direction parallel to a center axis of the housing cylinder block, wherein the center axis extends longitudinally along the arm boom.

3. The robot arm of claim 1, wherein the housing cylinder block comprises an at least substantially circular cylindrical outer wall, and the rotors of the at least three electric motors are arranged with their motor shafts in the interior of the housing cylinder block in such a way that the motor shafts are evenly distributed around a circumference disposed about a center axis of the housing cylinder block.

4. The robot arm of claim 1, wherein the housing cylinder block comprising the at least three electric motors forms a structural bearing element of the arm boom.

5. The robot arm of claim 1, wherein the housing cylinder block forms a common motor housing for all rotors of the at least three electric motors.

6. The robot arm of claim 5, wherein the rotors of the at least three electric motors are each rotatably positioned with their motor shafts in the housing cylinder block by ball bearings.

7. The robot arm of claim 6, wherein:
each rotor is rotatably arranged in the housing cylinder block by at least one front ball bearing facing an output-side end of the respective motor shaft.

8. The robot arm of claim 1, wherein:
the housing cylinder block comprises a unitary, integrally cast piece, in which a respective number of recesses corresponding to the at least three electric motors are formed; and
each of the at least three electric motors are inserted into a respective one of the corresponding recesses.

9. The robot arm of claim 1, wherein the housing cylinder block comprises a laminated stator core, which forms a common laminated stator core for all of the at least three electric motors.

10. The robot arm of claim 1, wherein the motor shafts of the at least three electric motors are arranged in the housing cylinder block on a common pitch circle around a center axis of the arm boom that extends in a longitudinal direction of the arm boom.

11. The robot arm of claim 1, wherein all rotors of the at least three electric motors are arranged in the housing cylinder block at the same axial height with respect to a center axis of the arm boom in the direction of a longitudinal extension of the arm boom.

* * * * *